United States Patent [19]

Koren et al.

[11] Patent Number: 5,861,965
[45] Date of Patent: *Jan. 19, 1999

[54] OPTICAL COMMUNICATION SYSTEM EMPLOYING SPECTRALLY SLICED OPTICAL SOURCE

[75] Inventors: Uziel Koren, Fair Haven; Kang-Yih Liou, Holmdel, both of N.J.

[73] Assignee: Lucent Technologies Inc., Murray Hill, N.J.

[ * ] Notice: The term of this patent shall not extend beyond the expiration date of Pat. No. 5,631,758.

[21] Appl. No.: 706,029

[22] Filed: Aug. 30, 1996

[51] Int. Cl.$^6$ ..................................................... H04J 14/00
[52] U.S. Cl. .......................... 359/123; 127/130; 127/140; 127/188
[58] Field of Search ..................................... 359/123, 132, 359/127, 130, 140, 181, 186, 188

[56] References Cited

U.S. PATENT DOCUMENTS 5,631,758  5/1997  Knox et al. .............................. 359/127

FOREIGN PATENT DOCUMENTS 0110828  5/1988  Japan ....................................... 359/123
213049  7/1983  United Kingdom .................... 359/123

OTHER PUBLICATIONS

K. Liou, et al, "Monolithically Integrated Semiconductor LED–Amplifier for Applications as Transceivers in Fiber Access Systems," IEEE Photonics Technology Letters, vol. 8, No. 6, Jun. 1996, pp. 800–802.

S. S. Wagner, et al, "Broadband High–Density WDM Transmission Using Superluminescent Diodes," Electronics Letters, 24 May 1990, vol. 26, No. 11, pp. 696–697.

M. H. Reeve, et al., "LED Spectral Slicing for Single–Mode Local Loop Applications," Electronics Letters, Mar. 31, 1988, vol. 24, No. 7, pp. 389–390.

Primary Examiner—Leslie Pascal
Attorney, Agent, or Firm—Brian K. Dinicola; Jeffery J. Brosemer

[57] ABSTRACT

An apparatus and method provides optical multiple wavelength signals using a single, broadband optical source such, for example, as an LED, to generate many independent optical wavelength channels. An optical transmitter includes a wavelength channel defining assembly which resolves the broad spectrum pulses output by the source into discrete wavelength bands constituting respective pulses (i.e., wavelength channels) and which inserts a delay between the bands to define a sequence of individually addressable channels.

In accordance with one embodiment of the invention, spectral splicing is achieved by a multiple channel filter, and insertion of the respective delays is achieved by individual fiber sections, each section having a length selected to introduce a particular delay, coupled to the output ports of the router. The inserted delays can be conveniently selected to separate adjacent wavelength channels and thereby minimize the likelihood of crosstalk. Pulses of the thus-resolved channels arrive at different times to a multiplexer which may be configured, for example, as a passive WDM multiplexer or as a star combiner. The resulting sequence of addressable wavelength channels may be supplied to one or more high-speed, broadband modulators, with each modulator being operable to modulate some or all of the channels.

25 Claims, 8 Drawing Sheets

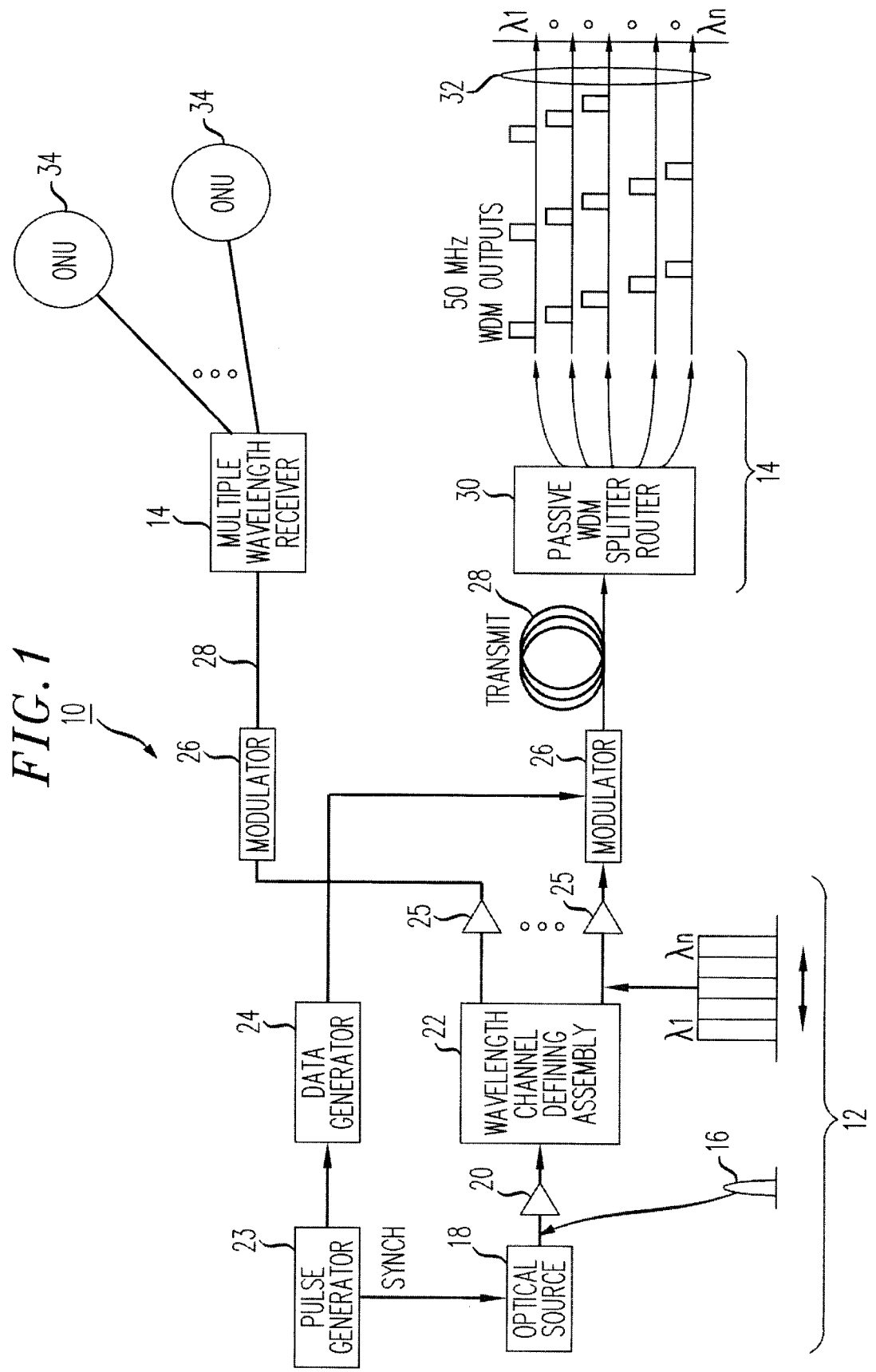

INPUT → MULTIPLE WAVELENGTH OUTPUTS

DEMULTIPLEXED WDM CHANNELS

MODULATED EYE-PATTERN OF CH.4

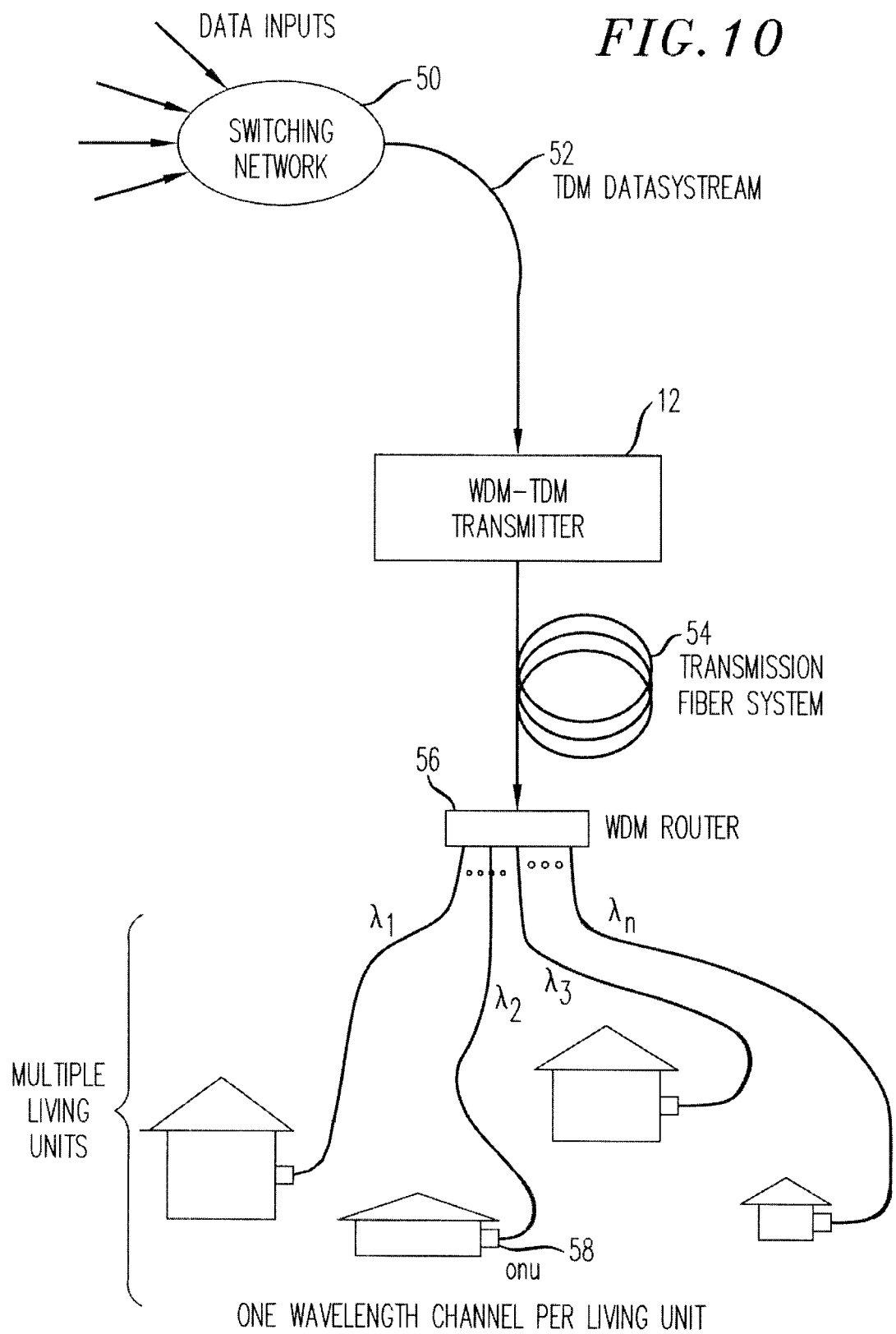

OPTICAL COMMUNICATION SYSTEM EMPLOYING SPECTRALLY SLICED OPTICAL SOURCE

FIELD OF THE INVENTION

The present invention relates generally to optical communications systems and, more particularly, to improvements in optical communications systems employing spectrally sliced, broad spectrum optical sources.

BACKGROUND OF THE INVENTION

The transmission capacity of optical communications systems is presently limited by the optical source modulation bandwidth and dispersive and nonlinear propagation effects. Although a span of optical fiber has a very broad optical bandwidth (10–20 THz), the system data rates transmitted over such spans are presently limited to about 2.5 Gbits/sec in single-channel communications systems. Wavelength division multiplexing (WDM) generally increases optical system capacity by simultaneously transmitting data on several optical carrier signals at different wavelengths. The total system capacity is increased by a factor equal to the number of different wavelength channels. Other advantages of WDM are realized in point-to-multipoint communications systems such as in fiber-to-the-home. In this case, improved power splitting budget, security, upgradability, service flexibility and lower component speed requirements compared to time-division-multiplex (TDM) point-to-point links make WDM attractive.

WDM systems which have heretofore been proposed generally include a separate optical modulation source for each optical channel or individual transmission wavelength. For example, an array of laser diodes may be used—with each laser diode being tuned to a different frequency and modulated individually. The laser frequencies are combined as, for example, by an optical coupler and are then launched into one end of an optical fiber. At the other end of the fiber, the wavelength channels are separated from one another and directed to corresponding receivers.

Due to a number of technical problems, presently proposed WDM systems are not regarded as being commercially viable for mass market applications like fiber distribution to the home. One such problem is the small number of channels currently accommodated. Specifically, while a WDM system would be considered cost-effective if a large number of channels (32–64 or even 128) were made available, present multi-channel laser diodes are very difficult to fabricate with acceptable yield even with as few as 8 channels. In addition, passive WDM splitters currently available have a large temperature variation of their passband channels, thereby requiring a continuous tunability in the multichannel sources that has not yet been achieved.

Therefore, although WDM offers an elegant solution to increasing the capacity and transparency of optical networks, WDM for fiber distribution networks as currently envisioned is not deemed to be cost-competitive with simple point-to-point schemes (one fiber per customer), and more cost-effective schemes are needed. For fiber-to-the home optical communications systems, low-cost methods of delivering optical signals into and out from the home is a challenging problem. Although time-domain multiplexing (TDM) of data streams would be another method of increasing transmission capacity, it is not desirable to build a specific network with expensive high frequency electronic components that are difficult to upgrade in the future. For example, in order to deliver 50 Mbits/sec data rates into a single house, a 32 channel system would require transmitters, routers, amplifiers, receivers and modulators with 1.5 Gbits/sec capacity and above. It is not desirable to place such expensive and state-of-the-art components into every home. In addition, it is desirable to have as much of the system in the field and in the home transparent and passive, i.e. line-rate independent and not requiring any electrical powering. In addition to the low data rate systems as required for local access (50–155 MHz), high data rate systems (622 MHz-2.5 Gbits/sec) can also benefit from WDM. In such a case, similar problems are caused by the difficulty in obtaining a multifrequency source with adequate channel tuning, stability and modulation bandwidth.

As is apparent from the above, there is a continuing need for an efficient and cost-effective WDM system that is capable of transmitting a large number of spectral channels.

SUMMARY OF THE INVENTION

The aforementioned deficiencies are addressed, and an advance is made in the art, by spectrally slicing the output spectrum of an optical source into a sequence of individually addressable wavelength channels. In accordance with an illustrative embodiment of the present invention, spectral slicing is achieved by a multiple channel filter such, for example, as a waveguide grating router, and the sequence is defined by a plurality of optical delay lines coupled to the outputs of the multiple channel filter. According to the invention, each delay line is associated with a respective wavelength channel and provides a delay of that channel which differs from the delay introduced on all the other channels so that a repeating sequence of discrete wavelength channels or pulses is provided.

The thus-formed streams of pulses may then be multiplexed, modulated, and transmitted over an optical medium such, for example, as one or more single-mode fibers to a remote receiver. Advantageously, a single, high-speed single-channel modulator may be used to separately modulate each of the wavelength channels—obviating the need for large arrays of modulators, wherein one modulator is used for each wavelength, associated with previous configurations.

Illustratively, each delay line may be configured as a section of fiber coupled to a corresponding output port of the waveguide grating router, with the length of each respective fiber section determining the magnitude of its corresponding delay. The lengths of adjacent delay line fibers may be selected such that the wavelength pulse trains are reordered prior to transmission to the remote receiver(s). Linear crosstalk due to interchannel spectral overlapping has been identified as a significant problem in WDM systems employing spectrally sliced sources. According to an especially preferred embodiment of the present invention, the arrival times of adjacent spectrally sliced channels, as seen by a remote receiver, are reordered in a manner that reduces such interchannel overlapping.

An optical multiple wavelength communication system is formed by using the multiple wavelength apparatus together with a multiple wavelength receiver for demultiplexing the received encoded optical signal into the plurality of modulated optical wavelength channels.

BRIEF DESCRIPTION OF THE DRAWINGS

The aforementioned features and benefits of the invention will be better understood from a consideration of the detailed description which follows taken in conjunction with the accompanying drawings, in which:

FIG. 1 is a block diagram of a multiple wavelength communication system constructed in accordance with the present invention;

FIG. 10 shows a spectrally sliced WDM transmission system.

DETAILED DESCRIPTION

According to the present invention, the broad spectrum output from a suitable optical source—illustratively, a light emitting diode (LED) having an output centered at a typical telecommunications wavelength such as, for example, 1550 nm—is spectrally sliced and then processed in a manner which enables it to reliably serve a larger number of subscribers than has heretofore been deemed practicable.

Figure 2A:
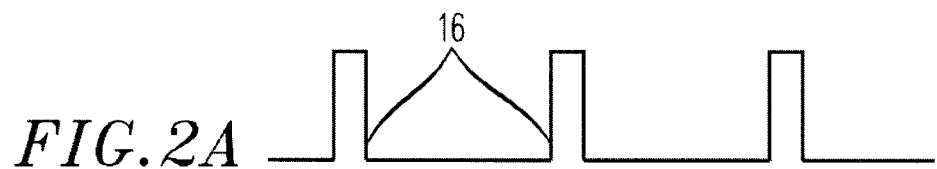
FIG. 2A is a graphical representation of an illustrative sequence of broad spectrum pulses from which a plurality of discrete wavelength channels are derived in accordance with one aspect of the present invention.
Figure 2B:
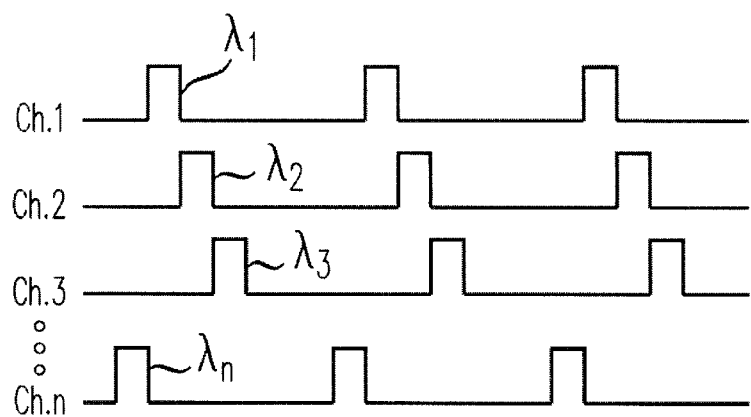
FIG. 2B is a graphical representation of discrete wavelength channels following spectral slicing.

An illustrative multiple wavelength optical communication system 10 constructed in accordance with the present invention is shown schematically in FIG. 1. As seen in FIG. 1, system 10 includes a transmitter 12 and a receiver 14. A broad spectrum optical pulse 16, from optical source 18, is amplified by amplifier 20 and supplied to channel defining assembly 22. A pulse generator 23 determines the width and repetition rate of the broad spectrum pulses which, illustratively, may be 2.5 ns and 20 ns, respectively (FIG. 2A). As will be explained in greater detail below, wavelength channel defining assembly 22 is operable to spectrally slice the output pulses supplied by optical source 18 into a plurality of discrete wavelength bands in the form of individual pulses $\lambda_1$–$\lambda_n$ and, as indicated conceptually in FIG. 2B, insert a time delay between them so that they are individually addressable. That is, the broad spectrum source is spectrally sliced and processed to form a series of modulated data pulses, each at a different wavelength.

Each different wavelength (referred to herein as a wavelength channel) is modulated with the information to be transmitted on that particular channel. The transmitter 12 of the present invention provides a method of transmitting data on many separate wavelength channels, using only a single broadband modulator. Optionally, a frequency-dependent filter (not shown) such, for example, as a cladding-dumping fiber grating or a multilayer interference filter may be connected to the output of wavelength channel defining assembly 22 to equalize the power spectra of some or all of the optical wavelength channels.

In the embodiment of FIG. 1, a data generator 24 generates multiple low-frequency data signals (illustratively 8–16 channels at 50 Mbits/sec per channel, for local access applications) that are time-division-multiplexed (TDM) up to a high data rate (400–800 Mbits/sec), in this example) by an electronic TDM unit (not shown). The resulting wavelength channels are encoded by modulator 26 using the high data rate signal output by the wavelength channel defining assembly and amplified by amplifier 25. As will be readily appreciated by those skilled in the art, the high data rate signal should have a data rate which is at least equal to the rate ($\gamma$) of the broad spectrum pulse rate multiplied by the number of wavelength channels utilized.

Advantageously, the high data rate signal containing may be encoded onto the multiple channel optical signal by passing it through a broadband optical modulator 26. This modulator 26 is capable of modulating optical signals over a wide wavelength range (50 nm bandwidth, typically) and has low polarization dependence. A bulk InGaAsP waveguide modulator is the preferred modulator 26 for this embodiment; however, any broadband optical modulator could be used. The output of modulator 26 is transmitted over an optical medium 28 (e.g., a single-mode optical fiber) to a multiple wavelength receiver 14 comprising, for example, a passive WDM splitter router 30 which demultiplexes the received optical signal into a plurality of modulated optical wavelength channels 32 (e.g., 50 MHz WDM channels) intended for the optical network unit 34 (ONU) of a particular subscriber.

While the receiver 14 has been described as utilizing a passive WDM splitter or router, it should be understood that a waveguide grating router, diffraction grating, interference filter array, or other apparatus for demultiplexing the received optical signal into the plurality of modulated optical wavelength channels may be utilized.

An investigative system utilizing an LED centered at 1550 nm as the optical source to serve up to 64 subscribers is depicted in FIG. 2. It should be noted that although an output spectrum centered about 1550 nm is shown and described in detail herein, it is nonetheless contemplated that the output spectrum of the optical source might alternatively be centered about some other wavelength of interest such, for example, as 1300 nm, and that reference herein to any particular wavelength band is by way of illustrative example only.

As will be readily appreciated by those skilled in the art, the number of subscribers which may be served by a single optical source is dependent upon its output power. In the exemplary arrangement of FIG. 3, in which the optical source is an LED centered at 1550 nm, amplifier 20 is preferably configured as a conventional erbium doped fiber amplifier (EDFA). Fiber amplifiers are not currently available, however, for many other wavelength bands as, for example, those around 1300 nm. In such cases, a semiconductor optical amplifier may be employed. The semiconductor optical amplifier may, if desired, be integrated with an LED optical source to obtain a monolithically integrated LED-amplifier structure. The fabrication of such devices is believed to be well within the skill of those familiar with the art. For a detailed description of an integrated LED-amplifier suitable for 1300 nm, however, reference may be had to a paper by K.-Y. Liou et al. entitled "Monolithically Integrated Semiconductor LED-Amplifier for Application as Transceiver in Fiber Access Systems", IEEE Photonics Technology Letters, Vol. 8, pp. 800–802.

Figure 3:
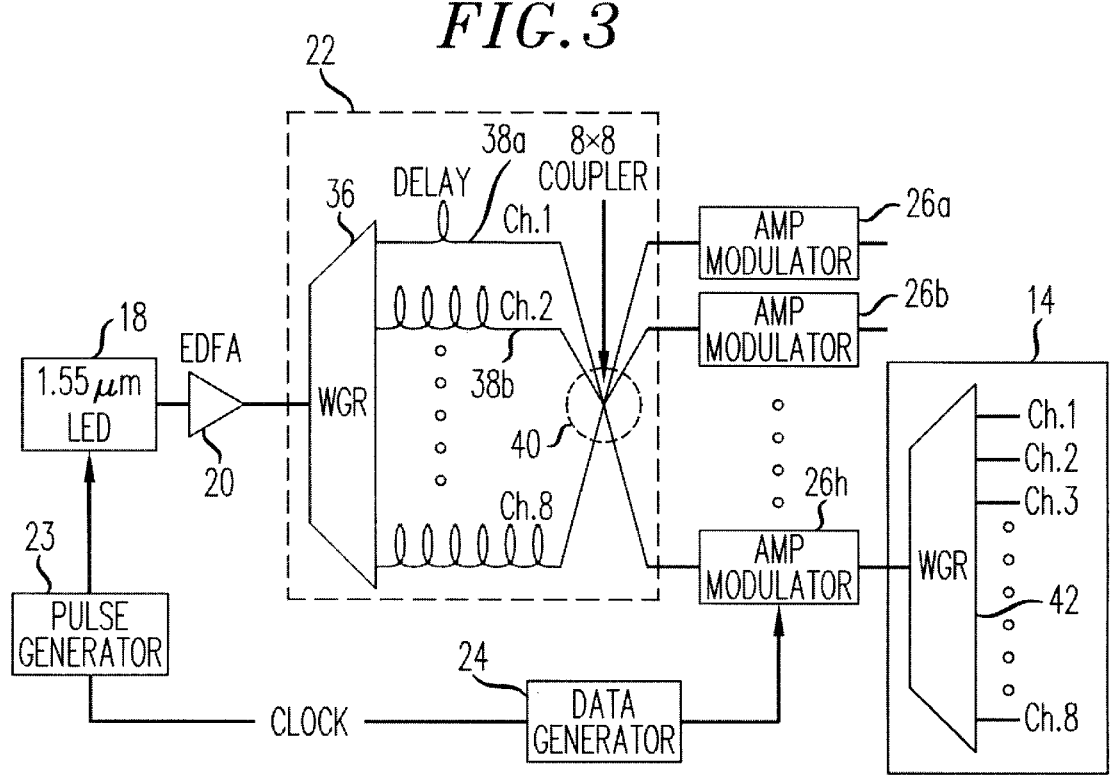
FIG. 3 is a schematic diagram of a multiple wavelength communication system in which a wavelength channel defining assembly constructed in accordance with an illustrative embodiment of the present invention is employed.
Figure 4:
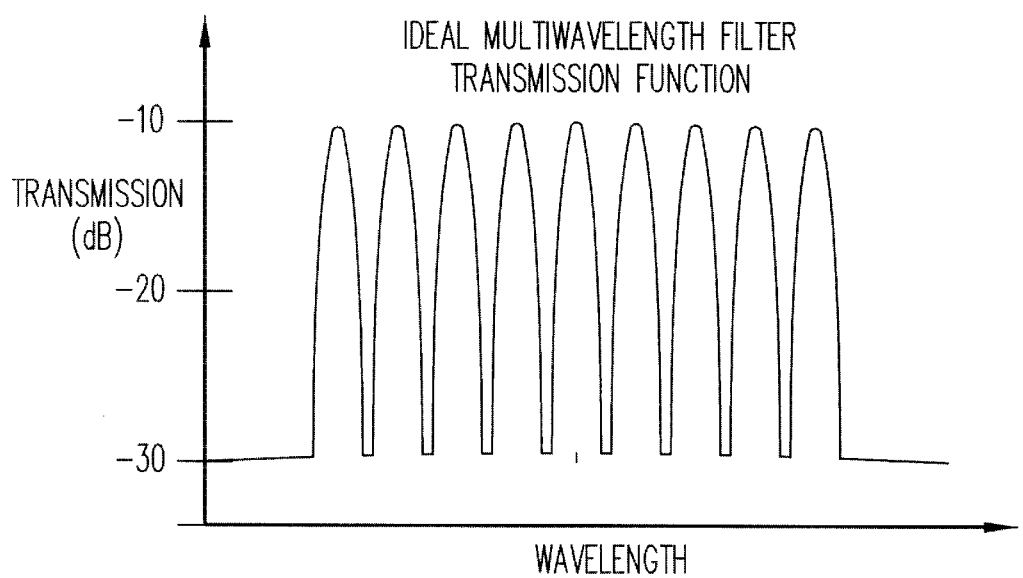
FIG. 4 depicts the ideal transmission function of a multiple wavelength filter that may be employed in the wavelength channel defining assembly of FIG. 3.

In any event, and with continued reference to the illustrative embodiment of FIG. 3, it will be seen that channel defining assembly 16 includes a multiple channel filter device (e.g. a waveguide grating router 36) that selects and routes each successive wavelength channel to a corresponding optical delay line (e.g., optical fiber sections 38a–38h) with as little crosstalk between the adjacent channels as possible. The transmission spectrum (wavelength comb) of an ideal multiple-channel filter device which may be employed is shown in FIG. 4.

Figure 5A:
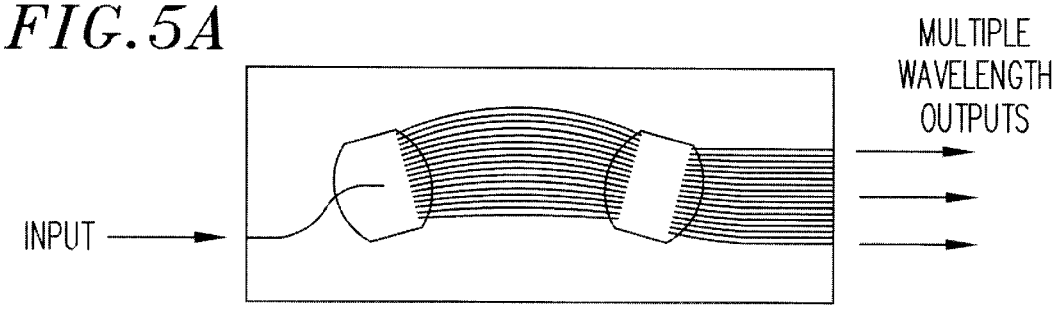
FIG. 5A shows an integrated-optic WDM device conventionally used to implement the spectral slicing waveguide grating router (WGR) employed as the multiple channel filter in the embodiment of FIG. 3.
Figure 5B:
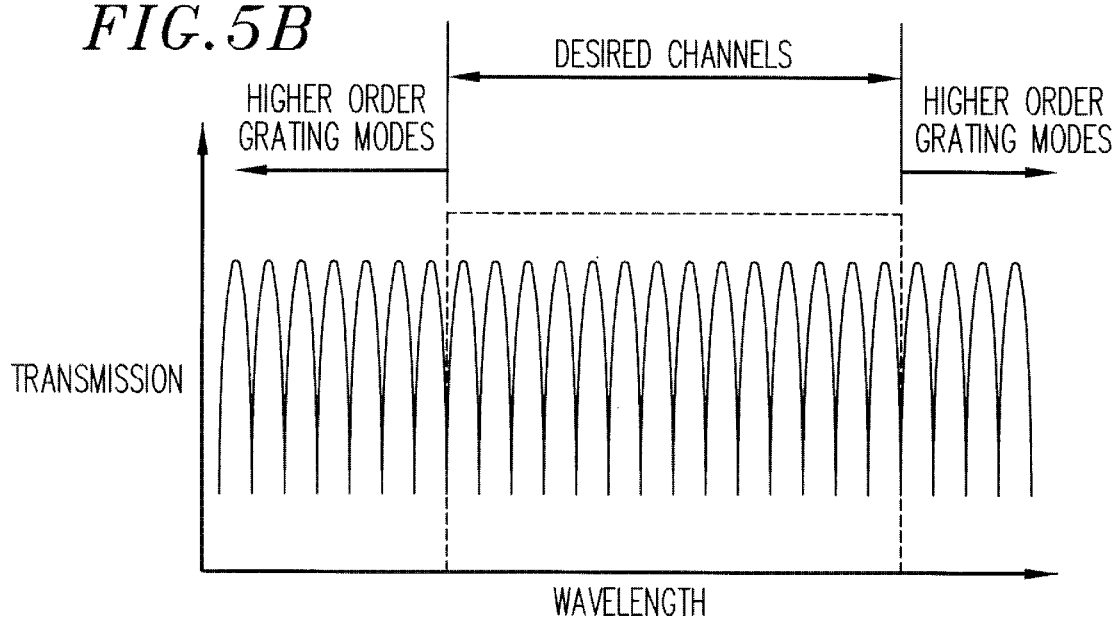
FIG. 5B shows the periodic passband transmission characteristic for the router device of FIG. 5A.

FIG. 5A shows an integrated-optic WDM device conventionally used to implement a spectral slicing waveguide grating router (WGR). FIG. 5B shows the periodic passband transmission characteristic for the router device 36. Within the band center, there are a number of desired transmission channels. Outside of that region, the integrated-optic WGR components exhibit a periodic passband behavior. For a detailed description of the construction and operation of such a router, reference may be had to a paper by C. Dragone et al. entitled "Integrated Optics N×N Multiplexer on Silicon" IEEE Photonics Technology Letters, Vol. 3, pp. 896–899, 1991.

Figure 6A:
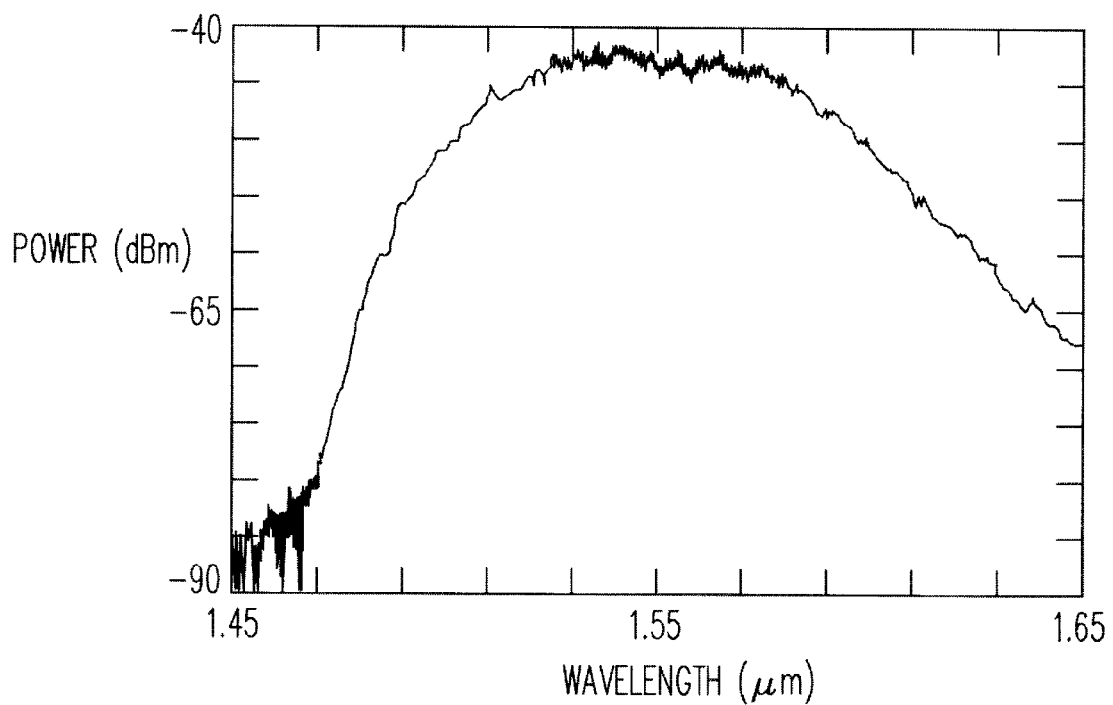
FIG. 6A is an exemplary frequency spectrum of a light emitting diode (LED) which may be employed as a broad spectrum optical source in accordance with the present invention.

To deliver an exemplary data rate of 50 Mb/sec per channel, the LED comprising illustrative optical source 18 was directly modulated, to −7.9 dBm peak power, with 2.5 nsec pulses at a repetition rate of 20 nsec. Such modulation results in a broad spectrum pulse such as the one shown in FIG. 6A. In the arrangement depicted in FIG. 3, amplifier 20 was configured as a two-stage fiber amplifier and was observed to increase the spectrally sliced output to −7 dBm peak power per channel. The measured signal gain provided by the fiber amplifier was 22 dB. The 200 GHz inter-channel spacing of the spectral slicing WGR 36 filtered out the amplified spontaneous emission noise from the fiber amplifier 20.

Figure 6B:
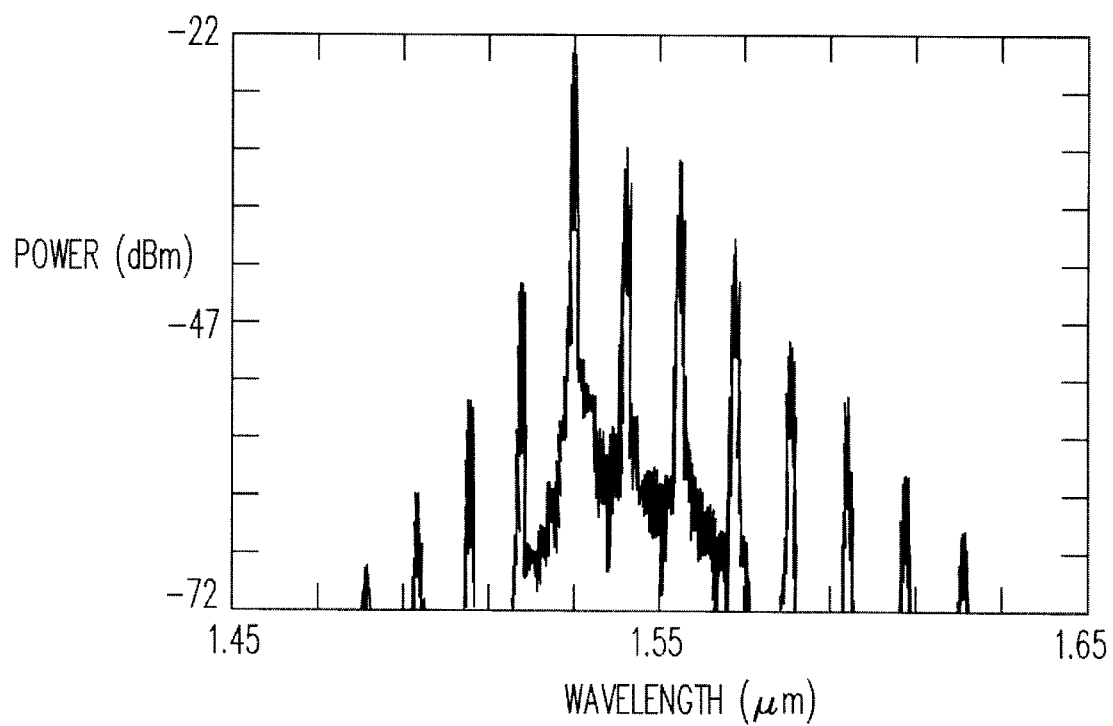
FIG. 6B depicts the frequency spectrum of FIG. 6A following amplification and spectral slicing to produce a number of discrete wavelength channels in accordance with the present invention.

FIG. 6B shows the amplified, spectrally sliced output spectrum of wavelength channel 4. The repeating peaks in FIG. 4 are separated by the 128-Å free spectral range of the WGR. All the other channels exhibit optical spectra similar to FIG. 4, except that they are equally spaced by the 16-Å channel spacing of the WGR employed. It will be readily appreciated by those skilled in the art from a comparison of FIGS. 2 and 4 that the amplified and sliced spectrum is modified by the optical gain spectrum of the erbium-doped fiber amplifier 18. The measured total insertion loss of the WGR for each channel, including the spectral slicing loss, was about 21 dB.

Returning to FIG. 3, it will be seen that in addition to the multiple channel filter as WGR 36 and delay lines 30a–30h, the illustrative wavelength channel defining assembly 22 further includes a multiple input port, multiple output port optical coupler 40. In a manner which will now be described, the delay lines and coupler collectively serve to multiplex the spectrally-sliced LED output of the multiple channel filter into a sequence of individually addressable wavelength channels indicated generally as channels 1–8. According to the present invention, fiber delay lines of different lengths are used at each of the output ports of the waveguide grating router 36 to delay one pulse width per channel and then multiplex, via the multiple port coupler 40, the respective pulses into a repeated pulse sequence. In the illustrative eight channel system depicted in FIG. 3, in which it is desired to obtain a data rate per channel of 50 Mb/s, the optical source 18 is pulsed with 1/(8×50 Mb/s), yielding a pulse width of 2.5 nsec at a repeating frequency of 400 MHz.

The delay lines are passive and easy to implement. Illustratively, for single mode fiber used at 1.3 $\mu$m with an index n of approximately 1.5, the delay time is 20.5 cm/nsec. Accordingly, a 2.5 nsec of delay is obtained for every 0.51 meters of fiber. In accordance with an especially preferred embodiment of the present invention, the different length delay lines are arranged in a manner (not shown) which reorders the monotonic sequence of channels output by router 36 into a different order in which adjacent wavelengths are separated to thereby minimize the effects of crosstalk due to spectral overlap. By way of illustrative example, channels 1–8 may be reordered as shown in FIG. 3 to obtain the sequence of channels 1, 4, 7, 2, 5, 8, 3, and 6 by using fiber delay line lengths of 0.51 meters, 2.04 meters, 3.57 meters, 1.02 meters, 2.55 meters, 4.08 meters, 1.53 meters, and 3.06 meters, respectively. Such an arrangement thereby provides a spacing between wavelength channels that is sufficient to overcome the disadvantages associated with prior art spectrally sliced systems. Of course, the delay lines 38a through 38h employed may be arranged to achieve any desired sequence of wavelength channels and the specific arrangements shown and described herein are by way of illustrative example only.

Figure 7:
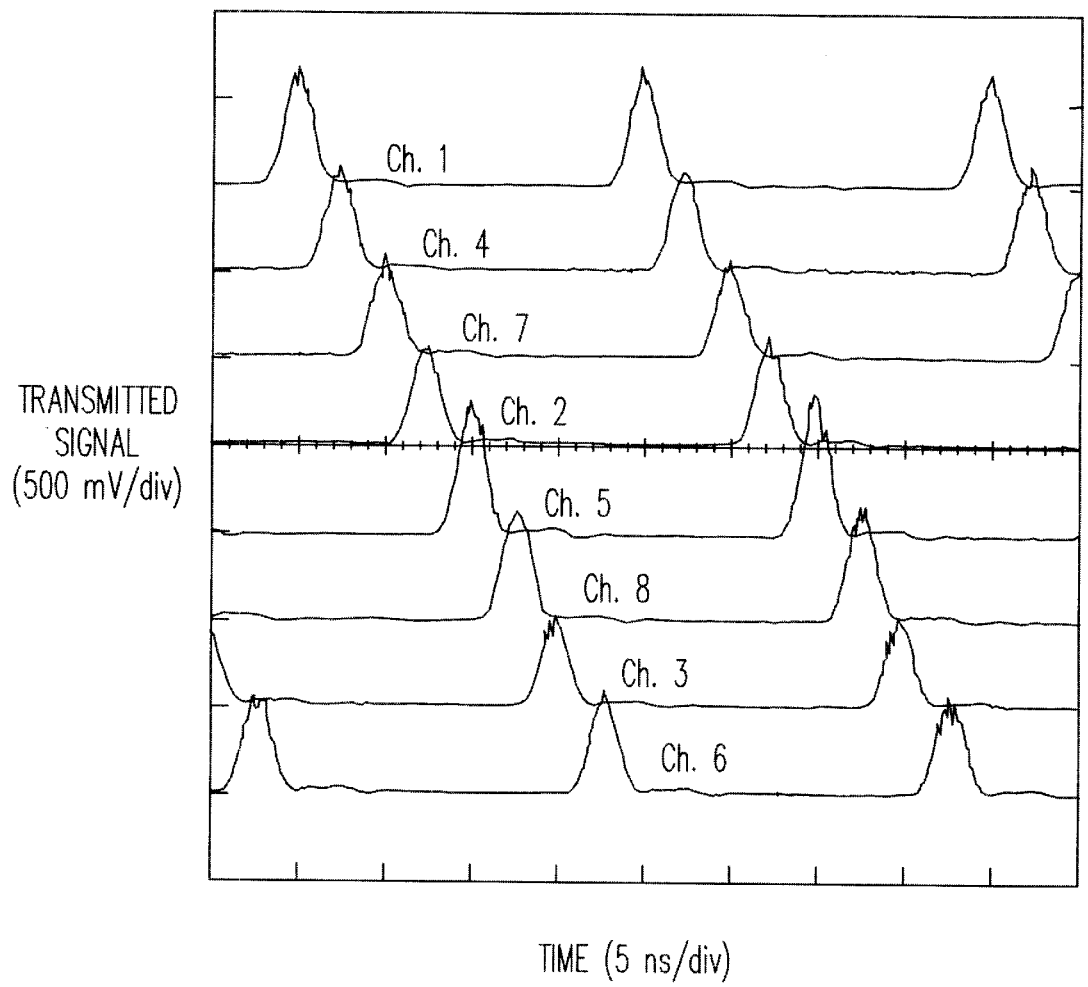
FIG. 7 shows the measured, delayed pulse streams of the eight wavelength channels output by the waveguide grating router employed in the illustrative embodiment of FIG. 3, following the insertion of delays and consequent reordering.

FIG. 7 shows the measured pulse streams of the eight wavelength channels output by the waveguide grating router 18 following the insertion of delays and consequent reordering to obtain the sequence mentioned in the preceding example. The channel output power variation, determined from the peak intensities in FIG. 7, was 1.6 dB.

As noted above, multiplexing of the thus-created plurality of wavelength channels or variably delayed pulses is achieved by optical coupler 40. In the 8-channel embodiment shown in FIG. 3, up to 64 subscribers may be served from a single optical source by employing a star coupler having eight input ports and eight output ports to combine the respective delayed pulse channels into a single eight-channel sequence that is then split evenly among the eight output ports of the coupler. The star coupler 40 used in the arrangement of FIG. 3 to combine the stream of pulses in the desired order had a measured insertion loss of 9.5 dB. A single modulator, as one of modulators 26a–26h coupled to a respective output port of the optical coupler 40, may be operated to modulate some or all of the channels present in the multiple channel sequence.

As will be readily appreciated by those skilled in the art, the multiple channel filter and optical coupler of wavelength channel defining assembly 22 introduce considerable insertion losses. Accordingly, care should be taken to ensure that the output power of the optical source is sufficient for the number of subscribers to be served. In the exemplary system depicted in FIG. 3, each modulator as M1 through Mn was configured as a polarization independent structure and monolithically integrated with a semiconductor amplifier to ensure a signal level adequate for transmission to receiver 14. Any optical receiver arrangement capable of receiving and demultiplexing an optical signal comprising a plurality of wavelength channels for subsequent distribution to respective subscribers may be employed. In the illustrative example of FIG. 3, a passive WDM receiver is provided utilizing a multiple channel filter 42 similar to the one employed in the wavelength channel defining assembly 22. Integrated optics versions of WDM filter device 42 have been made in silica-on-silicon substrates and with InGaAsP wafers including on-chip amplifiers. Bulk components, consisting of fiber arrays and gratings, or multiple interference filter components could also be used to provide a passive WDM receiver.

Figure 8A:
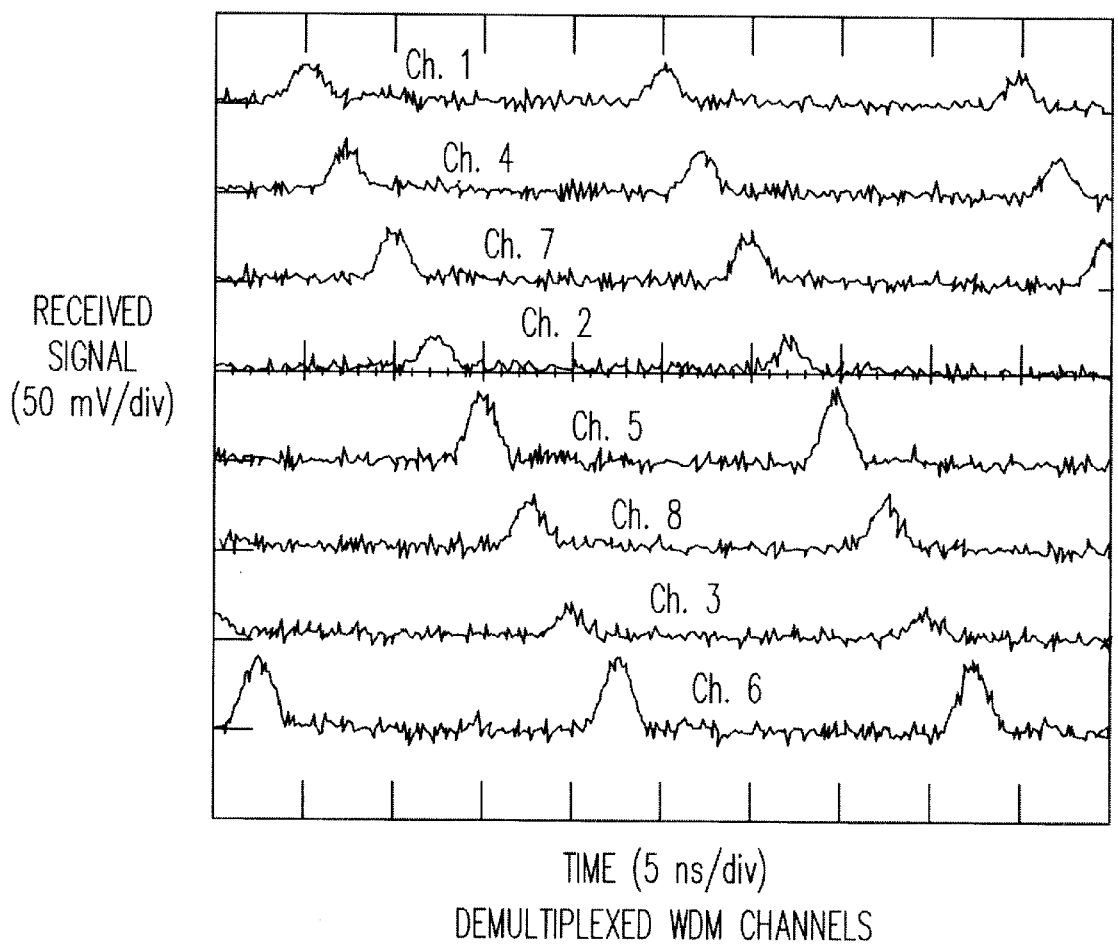
FIG. 8A shows the signals of FIG. 7 following transmission, demultiplexing, and detection at a remote receiver.
Figure 8B:
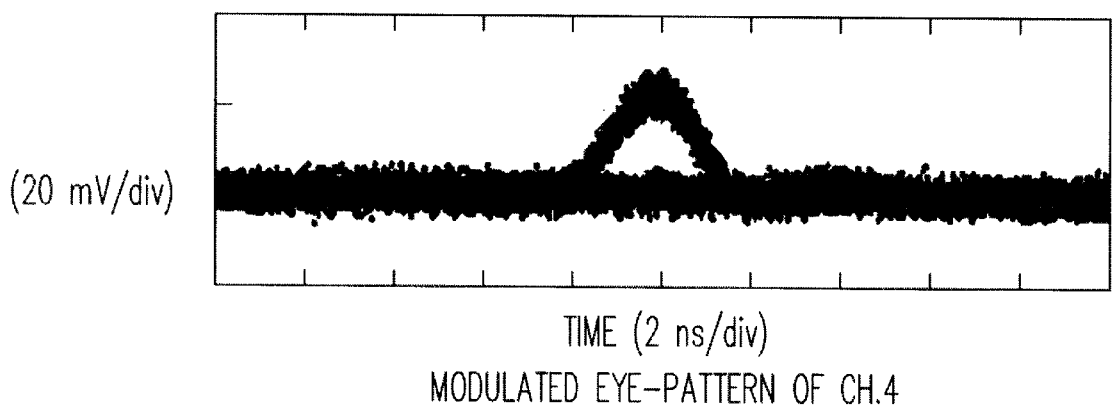
FIG. 8B shows the eye pattern, with data modulation, at −32 dBm received power of one of the received and detected channels provided during operation of the illustrative configuration depicted in FIG. 3.

Using a second WGR 42 at the receiver 14 for passive WDM demultiplexing of the eight channels, a 12.5 dB insertion loss was observed. The received demultiplexed signals, detected using a p-i-n receiver, are shown in FIG. 8A. With data modulation, the eye pattern at −32 dBm received power of a typical channel is shown in FIG. 8B.

According to our invention, if a WDM splitter in the receiver 14 is upgraded or changed (causing changes in wavelength channels), the TDM source at transmitter 12 can easily be changed to accommodate the new wavelength channel. Our approach is attractive since all the high-speed TDM electronics is at the transmitter 12 which can be located at a central office, and the simple passive WDM 42 (at receiver 14) is located, literally, in the field where it is less accessible and more hostile.

Figure 9A:
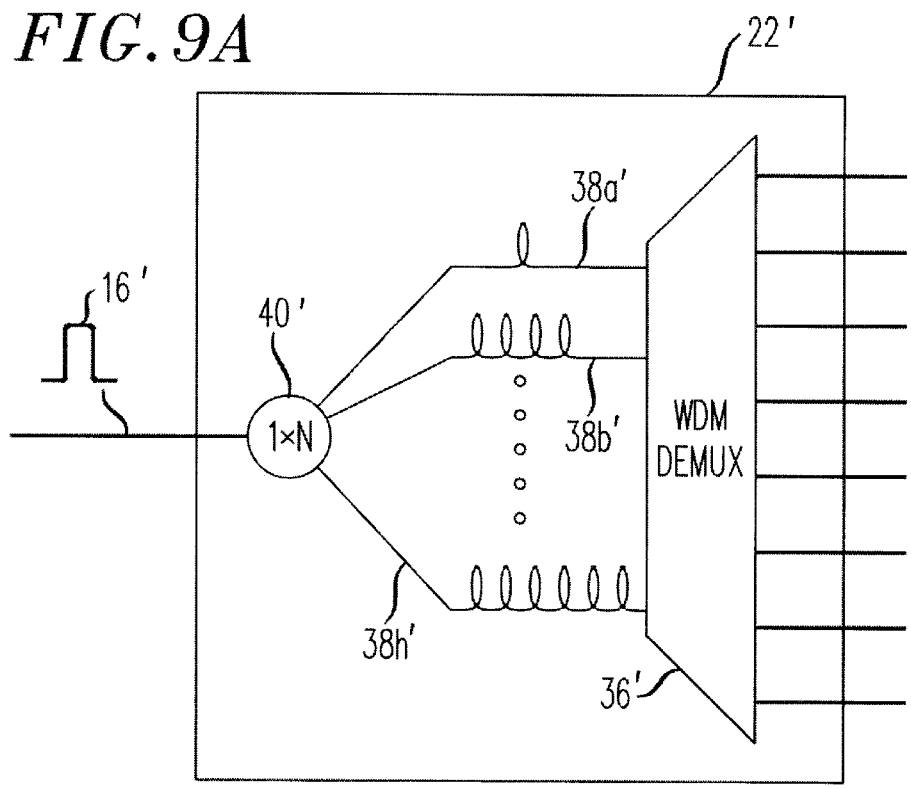
FIG. 9A is a schematic diagram of a wavelength channel defining assembly constructed in accordance with another embodiment of the present invention.
Figure 9B:
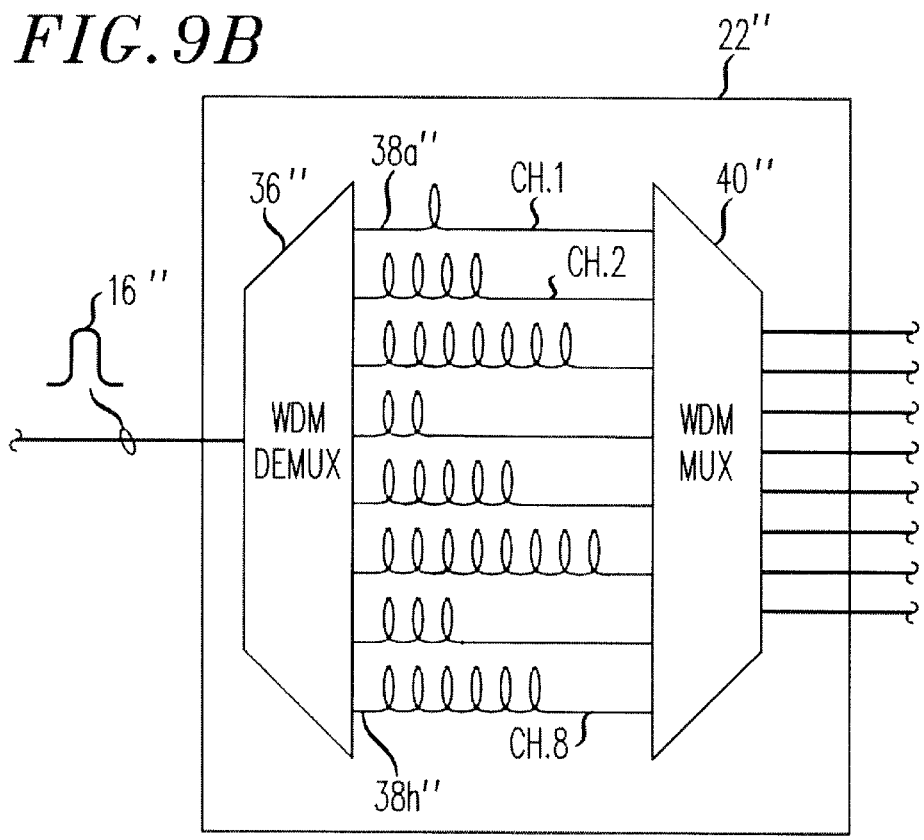
FIG. 9B is a schematic diagram depicting a wavelength channel defining assembly constructed in accordance with a further embodiment of the present invention.

FIGS. 9A and 9B depict alternate implementations of a wavelength channel defining assembly which may be employed in accordance with the present invention. Comparing the wavelength channel defining assembly 22 of FIG. 9A with the configuration utilized in the illustrative system of FIG. 3, it will be immediately apparent that the positions of the optical coupler and multiple channel filter may be reversed. In the illustrated embodiment of FIG. 9A, amplified broad spectrum pulses 16' received from the optical source (not shown) are split by a 1×N star coupler 40', with N denoting the number of channels to be spectrally sliced from the broad spectrum pulses, to thereby form a plurality of power-split replicas of the input signal. Optical delay lines 38a' through 38h' delay the respective broad spectrum pulse sequences in the same manner as the spectrally sliced pulses were delayed in the previously described embodiment. These delayed pulse sequences are then fed to respective inputs of a multiple input, multiple output WDM demultiplexer as, for example, M×N wavelength grating router 36', where N is the number of input wavelength channels and M is the number of output signals containing a sequence of the wavelength channels. In a sequential manner, the multiplexer spectrally slices each respective wavelength channels from a corresponding delayed broad spectrum pulse to form a plurality of output signals each containing a sequence of individually addressable wavelength channels. As will be readily ascertained by those skilled in the art, the order in which the respectively delayed broad spectrum pulse sequences are delivered to the inputs of the WDM multiplexer determines the order of the wavelength channels so that, in a manner similar to that described in connection with the illustrative embodiment of FIG. 3, the wavelength channels may be advantageously reordered to reduce the crosstalk associated with spectral overlap.

In the wavelength channel defining assembly 22" of FIG. 9B, the multiple channel filter is configured as a conventional 1×N WDM demultiplexer 36" while the optical coupler is configured as a conventional M×N WDM multiplexer as, for example, M×N wavelength grating router 38", where N is the number of input wavelength channels and M is the number of output signals containing a sequence of the wavelength channels. As seen in FIG. 9B, the respective output ports of the demultiplexer are coupled by optical delay lines 38a"–38h" to the corresponding input ports of the multiplexer.

FIG. 10 shows an exemplary network into which a spectrally sliced WDM transmission system constructed in accordance with the present invention would be installed. Data enters a switching network 50 from a data source or from another network. The switching network 50 formats the multichannel data into a high-speed TDM stream 52 to be used with the WDM transmitter. The modulators (not shown) of WDM transmitter 12 then encode the high-speed TDM data stream onto the individually addressable sequence of spectrally sliced wavelength channels and transmits the data through one or more transmission fiber systems (illustratively, 10–20 km)—only one of which, generally indicated at reference numeral 54, is shown—to the remote location where a WDM splitter device 56 is located. The individual wavelength channels are then separated at the WDM device 56, and each wavelength signal is directed to a separate ONU (optical network unit) 58 which receives the data with a low-rate inexpensive decoding receiver operating, illustratively, at 50 MHz.

Although the foregoing detailed description has described the present invention primarily in terms of particular applications of spectrally sliced-source WDM systems, it should be understood that the embodiments discussed are exemplary only. Many variations may be made in the arrangements shown, including the type of optical signal source, the selection and arrangement of channel filtering and optical coupling components within the wavelength channel defining assembly, the type of optical delay lines, the type of optical modulator, the type of WDM splitter, and the type of network architecture for implementation of a spectrally sliced, delay inserting WDM system. These and other alternatives and variations will be readily apparent to those skilled in the art, and the present invention is therefore limited only by the appended claims.

We claim:

1. An optical multiple wavelength apparatus comprising
   a broad spectrum optical source operable at a first rate to generate a sequence of output pulses having a spectral bandwidth encompassing a plurality of discrete wavelength bands; and
   a channel defining assembly optically coupled to said broad spectrum source for resolving the output pulses of the optical source into said plurality of discrete wavelength bands, inserting a time delay between said discrete wavelength bands to thereby define a sequence of individually addressable wavelength channels, and combining the discrete wavelength bands into at least one multiplexed output signal.

2. The optical multiple wavelength apparatus of claim 1, further including an optical modulator encoding at least one optical wavelength channel using a data signal operating at a second rate equal to or greater than said first rate to form at least one encoded optical channel.

3. The optical multiple wavelength apparatus of claim 2, wherein the second rate is equal to or greater than said first rate multiplied by the number of optical wavelength channels.

4. The optical multiple wavelength apparatus of claim 2, wherein each discrete wavelength channel comprises short optical pulses having a pulse width that is less than or equal to the inverse of the second rate.

5. The optical multiple wavelength apparatus of claim 2, wherein each discrete wavelength channel comprises short optical pulses having a pulse width that is greater than the inverse of the second rate.

6. The optical multiple wavelength apparatus of claim 5, wherein the channel defining assembly further includes a plurality of optical fiber delay lines, each delay line being optically coupled to one of the output ports of said demultiplexer, for delaying the time when short optical pulses associated with a given wavelength channel arrive at an output of the channel defining assembly relative to when pulses associated with other wavelength channels arrive.

7. The optical multiple wavelength apparatus of claim 6, wherein the channel defining assembly further includes an optical combiner having a plurality of input ports and at least one output port for receiving respectively delayed optical pulses from said delay lines and combining at least some of them for subsequent transmission over a common waveguide.

8. The optical multiple wavelength apparatus of claim 7, wherein said optical combiner is a star coupler.

9. The optical multiple wavelength apparatus of claim 7, wherein said optical combiner is a wavelength division multiplexer.

10. The optical multiple wavelength apparatus of claim 1, wherein the optical source is an optically amplified light emitting diode.

11. The optical multiple wavelength apparatus of claim 1, wherein the channel defining assembly includes a wavelength division demultiplexer having an input port optically coupled to said optical source and a plurality of output ports, said wavelength division multiplexer being operable to resolve each input optical pulse into a plurality of short optical pulses, each short optical pulse corresponding to one of said discrete wavelength bands and being supplied at one of said plurality of output ports.

12. The optical multiple wavelength apparatus of claim 11, wherein said wavelength division demultiplexer includes a waveguide grating router and wherein said optical source is an optically amplified light emitting diode.

13. The optical multiple wavelength apparatus of claim 1, wherein said wavelength channel defining assembly includes a star coupler having N input ports and M output ports, a plurality of optical fiber delay lines each coupled to a corresponding one of said output ports, and a wavelength division multiplexer having input ports each coupled to a respective one of said fiber delay lines, where N is an integer equal to or greater than one, M is an integer equal to a maximum number of optical channels definable by the wavelength channel defining means, and at least one of said input ports is coupled to said optical source.

14. A transmitter for use in an optical communication system, comprising:

a broad spectrum optical source operable at a first rate to generate a sequence of output pulses having a spectral bandwidth encompassing a plurality of discrete wavelength bands;

channel defining means optically coupled to said broad spectrum source for resolving the output pulses of the optical source into a plurality of short optical pulses corresponding to said discrete wavelength bands, for inserting a time delay between said short optical pulses to thereby define a reordered sequence of individually addressable wavelength channels, and for combining the discrete wavelength bands into at least one multiplexed output signal; and an optical modulator for encoding at least one of the wavelength channels using a data signal operating at a second rate equal to or greater than said first rate to form an encoded optical channel.

15. The transmitter of claim 14, wherein adjacent wavelength channels are separated in the time domain in the reordered sequence of wavelength channels to thereby reduce crosstalk.

16. A method of operating a transmitter in an optical communication system, comprising the steps of:

resolving output pulses of a broad spectrum optical source into a plurality of discrete wavelength bands;

inserting a time delay between the resolved discrete wavelength bands to thereby define a sequence of individually addressable wavelength channels; and combining the discrete wavelength bands into at least one multiplexed output signal.

17. The method of claim 16, further including a step of sequentially modulating, using a single modulator after the combining step, a plurality of the wavelength channels with data for transmission to a remote receiver.

18. The method of claim 16, wherein the sequence of resolved discrete wavelength bands is reordered during said time delay inserting step.

19. The method of claim 16, further including a step of amplifying the output of the optical source prior to said resolving step.

20. A method of operating a multiple wavelength optical communication system, comprising the steps of:

resolving output pulses of a broad spectrum optical source into a plurality of discrete wavelength bands;

inserting a time delay between the discrete wavelength bands to thereby define a sequence of individually addressable wavelength channels;

combining the resolved discrete wavelength bands into at least one multiplexed output signal; and sequentially modulating after the combining step, using a single modulator, a plurality of the wavelength channels with data for transmission to a remote receiver.

21. The method of claim 20, further including a step of launching the modulated wavelength channels into an optical medium for transmission to a multiple wavelength receiver.

22. The method of claim 21, further including a step of receiving the launched channels at multiple wavelength receiver comprising a waveguide grating router followed by photodetectors.

23. The method of claim 21, further including a step of receiving the launched channels at a multiple wavelength receiver comprising a diffraction grating followed by photodetectors.

24. The method of claim 21, further including a step of receiving the launched channels at a multiple wavelength receiver comprising an interference filter array followed by photodetectors.

25. The method of claim 21, further including a step of receiving the launched channels at a multiple wavelength receiver comprising a wavelength division demultiplexer followed by photodetectors.

* * * * *